US012728812B1

(12) United States Patent
Gomes

(10) Patent No.: US 12,728,812 B1
(45) Date of Patent: Sep. 8, 2026

(54) ARCHED CENTER AIRBAG

(71) Applicant: GM GLOBAL TECHNOLOGY OPERATIONS LLC, Detroit, MI (US)

(72) Inventor: Marcelo Ferreira Gomes, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/278,718

(22) Filed: Jul. 23, 2025

(51) Int. Cl.
*B60R 21/231* (2011.01)
*B60R 21/207* (2006.01)
*B60R 21/2338* (2011.01)

(52) U.S. Cl.
CPC ...... *B60R 21/23138* (2013.01); *B60R 21/207* (2013.01); *B60R 21/2338* (2013.01); *B60R 2021/23146* (2013.01); *B60R 2021/23382* (2013.01)

(58) Field of Classification Search
CPC ............ B60R 21/23138; B60R 21/207; B60R 21/2338; B60R 2021/23382; B60R 2021/23146
See application file for complete search history.

(56) References Cited

U.S. PATENT DOCUMENTS

| | | | | |
|---|---|---|---|---|
| 10,814,824 | B2 * | 10/2020 | Song | B60R 21/233 |
| 10,864,881 | B2 * | 12/2020 | Park | B60R 21/207 |
| 10,974,686 | B2 * | 4/2021 | Moon | B60R 21/207 |
| 11,091,111 | B2 * | 8/2021 | Deng | B60R 21/013 |
| 11,155,232 | B2 * | 10/2021 | Moon | B60R 21/2338 |
| 11,230,250 | B2 * | 1/2022 | Sturm | B60R 21/2338 |
| 11,407,376 | B2 * | 8/2022 | Moon | B60R 21/23138 |
| 11,661,026 | B2 * | 5/2023 | Jo | B60R 21/23138 280/730.2 |
| 11,912,225 | B2 * | 2/2024 | Azuma | B60R 21/23138 |
| 12,103,486 | B1 * | 10/2024 | Moon | B60R 21/231 |
| 12,134,363 | B2 * | 11/2024 | Ueda | B60R 21/207 |
| 12,233,806 | B2 * | 2/2025 | Nagasawa | B60R 21/23138 |
| 12,496,994 | B2 * | 12/2025 | Acker | B60R 21/23138 |
| 2021/0094499 | A1 | 4/2021 | Deng et al. | |
| 2024/0198950 | A1 * | 6/2024 | Acker | B60R 21/23138 |

FOREIGN PATENT DOCUMENTS

| | | |
|---|---|---|
| CN | 112141038 A | 12/2020 |
| CN | 115723702 A | 3/2023 |

OTHER PUBLICATIONS

German Office Action from counterpart DE1020251361096, dated May 6, 2026.

* cited by examiner

*Primary Examiner* — Jason D Shanske
*Assistant Examiner* — Joselynn Y Sliteris

(57) ABSTRACT

An airbag assembly including: an inflator; a diffuser; and an airbag defining an air chamber. The airbag includes: an opening to the air chamber in communication with the inflator; an upper end; a lower end; an outer side surface extending from the upper end to the lower end; and an inner side surface extending from the upper end to the lower end opposite to the outer side surface. The inner side surface is concave and configured to face an occupant of a seat when the airbag is deployed. The airbag is a single chamber airbag defining only the air chamber. The outer side surface and the inner side surface are curved to provide the airbag with an arched shape.

17 Claims, 5 Drawing Sheets

10
20
50
110
120
14
112
22
12
122
132
130
140

ARCHED CENTER AIRBAG

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to airbags, such as vehicle airbags.

An airbag is a vehicle safety device configured to protect occupants during a collision. An airbag is a cushion-like bag that inflates rapidly in the event of an impact to provide a soft barrier between an occupant and hard surfaces, such as a steering wheel, dashboard, or windows, for example. Types of airbags include front airbags, side airbags, curtain airbags, knee airbags, rear-seat airbags, etc. Airbags are used in various non-automotive applications as well.

SUMMARY

The present disclosure provides for, in various features, an airbag assembly including: an inflator; a diffuser; and an airbag defining an air chamber. The airbag includes: an opening to the air chamber in communication with the inflator; an upper end; a lower end; an outer side surface extending from the upper end to the lower end; and an inner side surface extending from the upper end to the lower end opposite to the outer side surface. The inner side surface is concave and configured to face an occupant of a seat when the airbag is deployed. The airbag is a single chamber airbag defining only the air chamber. The outer side surface and the inner side surface are curved to provide the airbag with an arched shape.

In further features, the outer side surface is convex.

In further features, the air chamber extends completely from the upper end to the lower end of the airbag.

In further features, the inner side surface is shorter than the outer side surface.

In further features, the inner side surface includes inner pleats configured to arch the inner side surface.

In further features, the airbag is configured to be deployed from a side of the seat.

In further features, the airbag is configured as a side impact airbag.

In further features, the airbag includes internal tethers configured to draw the upper end and the lower end towards each other to give the inner side surface a concave shape.

In further features, the airbag includes a tapered portion between the upper end and the lower end, at the tapered portion the outer side surface and the inner side surface are closer together than at both an upper midpoint between the tapered portion and the upper end and a lower midpoint between the tapered portion and the lower end.

The present disclosure also provides for, in various features, an airbag assembly including: an inflator, a diffuser, and an airbag. The airbag is configured as a side impact airbag to be deployed from a side of a seat. The airbag includes the following: an opening to an interior of the airbag that is in communication with the inflator; an upper end; a lower end; a convex outer side surface extending from the upper end to the lower end; a concave inner side surface extending from the upper end to the lower end opposite to the convex outer side surface, the concave inner side surface is configured to face an occupant of the seat when the airbag is deployed; a tapered portion between the upper end and the lower end, at the tapered portion the convex outer side surface and the concave inner side surface are closer together than at both an upper midpoint between the tapered portion and the upper end and a lower midpoint between the tapered portion and the lower end; and a single air chamber defined by the upper end, the lower end, the convex outer side surface, and the concave inner side surface, the single air chamber extending completely from the upper end to the lower end of the airbag.

In further features, the convex outer side surface and the concave inner side surface are curved to provide the airbag with an arched shape.

In further features, the concave inner side surface is shorter than the convex outer side surface.

In further features, the concave inner side surface includes inner pleats configured to arch the concave inner side surface.

In further features, the airbag includes internal tethers configured to draw the upper end and the lower end towards each other to give the concave inner side surface a concave shape.

The present disclosure also provides for a vehicle including a seat and an airbag. The airbag is mounted adjacent to the seat and configured as a side impact airbag to be deployed from a side of the seat. The airbag includes: an opening to an interior of the airbag that is in communication with an inflator; an upper end; a lower end; a convex outer side surface extending from the upper end to the lower end; a concave inner side surface extending from the upper end to the lower end opposite to the convex outer side surface, the concave inner side surface is configured to face an occupant of the seat when the airbag is deployed; a tapered portion between the upper end and the lower end, at the tapered portion the convex outer side surface and the concave inner side surface are closer together than at both an upper midpoint between the tapered portion and the upper end and a lower midpoint between the tapered portion and the lower end; and a single air chamber defined by the upper end, the lower end, the convex outer side surface, and the concave inner side surface, the single air chamber extending completely from the upper end to the lower end of the airbag.

In further features, the convex outer side surface and the concave inner side surface are curved to provide the airbag with an arched shape.

In further features, the concave inner side surface is shorter than the convex outer side surface.

In further features, the concave inner side surface includes inner pleats configured to arch the concave inner side surface.

In further features, the airbag includes internal tethers configured to draw the upper end and the lower end towards each other to give the concave inner side surface a concave shape.

In further features, the airbag is mounted on an inner side surface of the seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure generally provides for side impact airbags for vehicles and any suitable non-vehicular applications. The airbags of the present disclosure each define only a single air chamber, which simplifies manufacturing and results in a brick size that is smaller than multi-chamber airbags when deflated and stowed. In contrast to the airbags of the present disclosure, multi-chamber side airbags include a first chamber configured to be deployed opposite to an occupant's head, and a second chamber configured to be deployed opposite to the upper side body of the occupant. Such multi-chamber side airbags are complex to manufacture and result in a stowed brick size that is relatively large. The single chamber side airbags of the present disclosure are arched and otherwise curved to curve over the seat that the airbags are mounted to. The airbags of the present disclosure thus curve over the occupant's shoulder, for example, to cushion the occupant in the event of a side impact.

Figure 1:
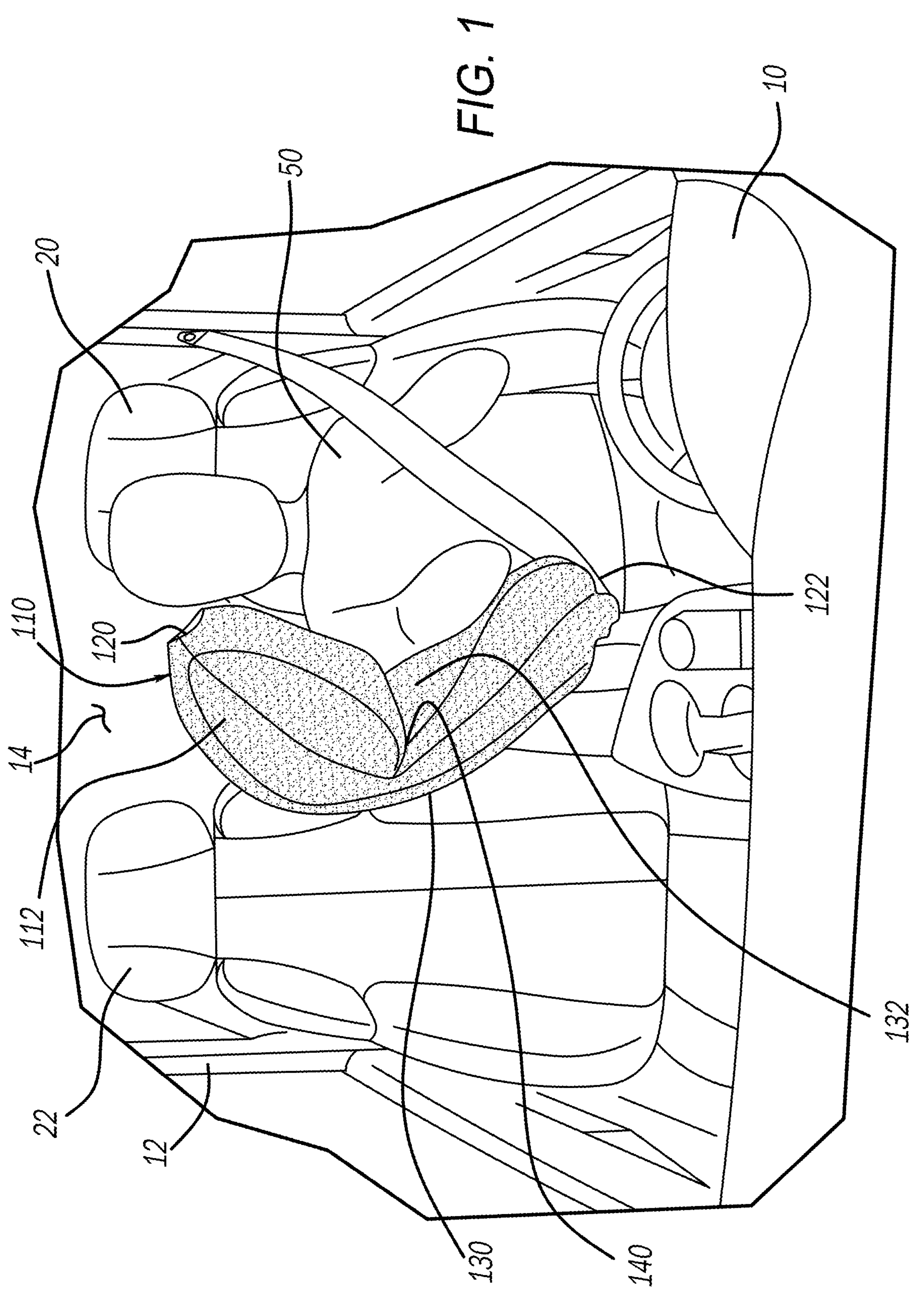
FIG. 1 illustrates a front passenger compartment of a vehicle including an airbag in accordance with the present disclosure in a deployed state.

FIG. 1 illustrates an example of a vehicle 10 including an airbag assembly 110 in accordance with the present disclosure. The vehicle 10 may be any suitable vehicle. In the example illustrated, the vehicle 10 includes a body 12 defining a passenger compartment 14. Within the passenger compartment 14 is a front driver's seat 20 and a front passenger's seat 22. An occupant 50 is shown seated in the front driver's seat 20.

The airbag assembly 110 is configured as a side impact airbag assembly for protecting the occupant 50 in the event that the vehicle 10 experiences a side impact. The airbag assembly 110 is configured to be mounted to an inner side of the front driver's seat 20 or the front passenger's seat 22. The airbag assembly 110 may be configured to be mounted to an inner side of any rear seat of the vehicle 10 as well. In the example illustrated, the airbag assembly 110 is mounted within an inner side of the front driver's seat 20, which is a side opposite to the driver's side door.

Figure 2:
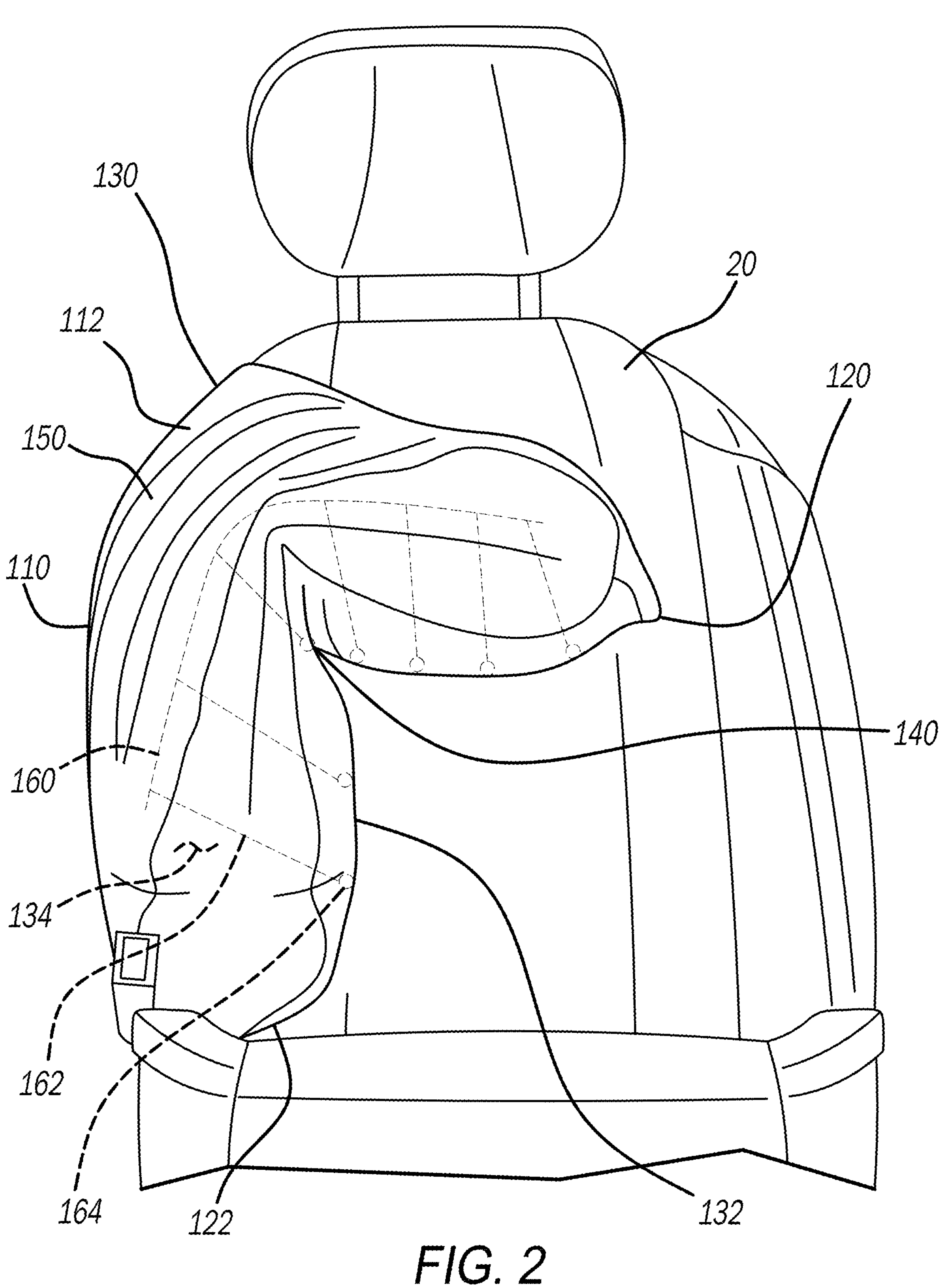
FIG. 2 illustrates a driver's seat of the vehicle including the airbag of FIG. 1 in the deployed state.
Figure 3:
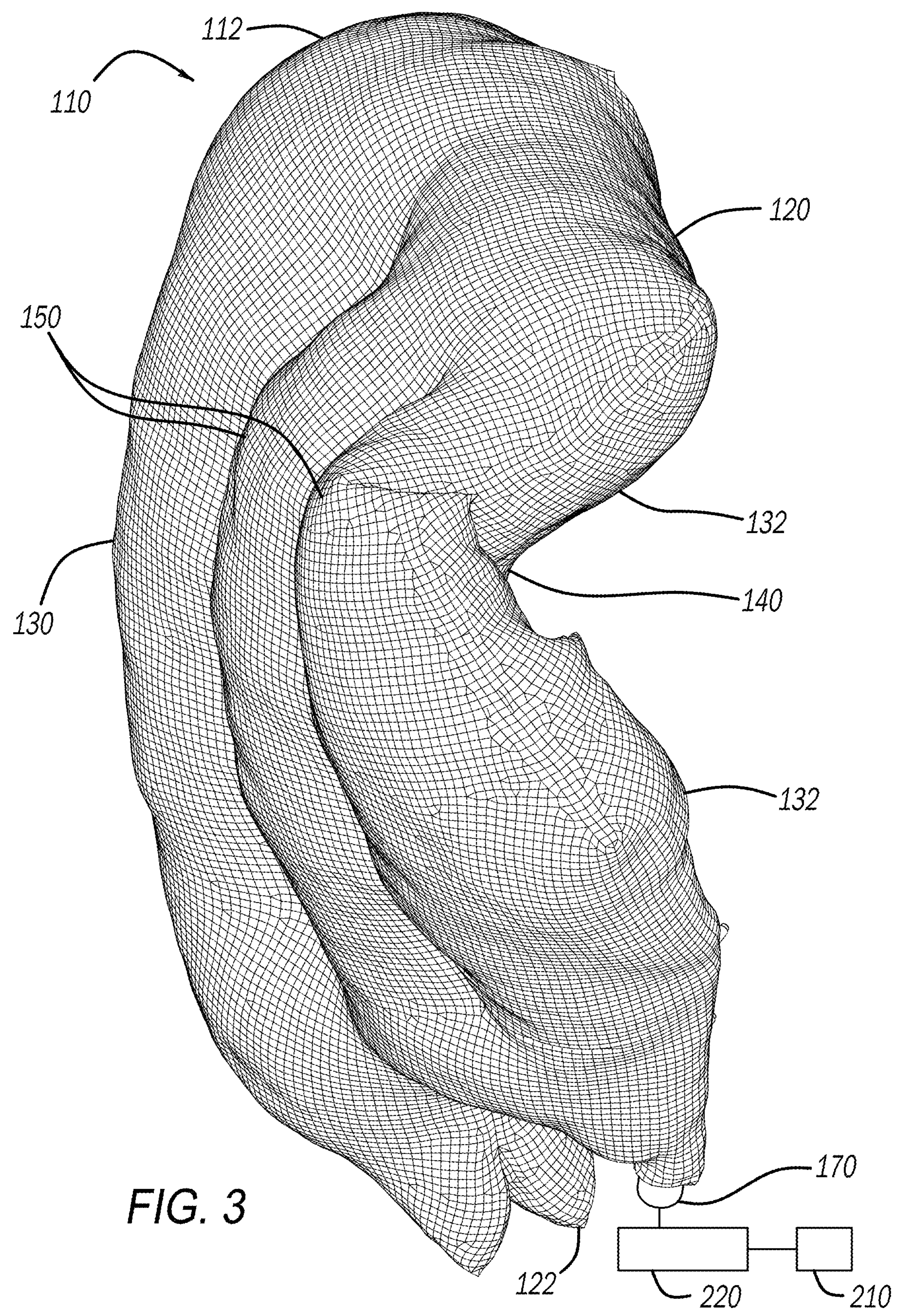
FIG. 3 is a perspective view of the airbag of FIG. 1.

With continued reference to FIG. 1, and additional reference to FIGS. 2 and 3, the airbag assembly 110 generally includes an airbag 112, an inflator 210 (FIG. 3), and a diffuser 220 (FIG. 3). The airbag 112 is made of any suitable flexible material, such as any suitable fabric. The airbag 112 includes an upper end 120, a lower end 122 opposite to the upper end 120, an outer side surface 130, and an inner side surface 132.

The airbag 112 defines an air chamber 134. More specifically, the air chamber 134 is defined by the upper end 120, the lower end 122, the outer side surface 130, and the inner side surface 132 of the airbag 112. The air chamber 134 is a single air chamber extending completely from the upper end 120 to the lower end 122. The airbag 112 defines only a single air chamber, which is the air chamber 134. The airbag 112 does not define multiple air chambers, which simplifies manufacturing and allows the airbag 112 to fit in a housing when deflated that is smaller than a housing required for an airbag with multiple chambers.

The airbag 112 includes a tapered portion 140 between the upper end 120 and the lower end 122. At the tapered portion 140, the outer side surface 130 and the inner side surface 132 are closer together than at both an upper midpoint between the tapered portion 140 and the upper end 120, and a lower midpoint between the tapered portion 140 and the lower end 122. The tapered portion 140 is configured to pinch the inner side surface 132 inward to curve the airbag 112 and provide the airbag 112 with a curved or arched shape, which when deployed will result in the airbag 112 curving over the shoulder area of the occupant 50, as illustrated in FIG. 1.

The outer side surface 130 is curved from the upper end 120 to the lower end 122 to be convex relative to an exterior of the airbag 112. The inner side surface 132 is curved from the upper end 120 to the lower end 122 to be concave relative to an exterior of the airbag 112. The inner side surface 132 is configured to face the occupant 50 of the seat (such as the front driver's seat 20) and curve towards the occupant 50. The convex shape of the outer side surface 130 and the concave shape of the inner side surface 132 provides the airbag 112 with an arched shape with the upper end 120 pointing towards the occupant 50 when the airbag 112 is inflated. To further provide the airbag 112 with the arched shape, the inner side surface 132 is shorter than the outer side surface 130.

To further provide the airbag 112 with the arched shape, the airbag 112 includes an internal tether system 150 including tethers 162. Any suitable number of the tethers 162 may be included. The tethers 162 include pieces of fabrics sewn at the outer side surface 130 and the inner side surface 132. The tethers 162 may extend lengthwise along the airbag 112 in a direction towards and away from the upper end 120 and the lower end 122, for example. The tethers 162 are formed in any suitable manner to provide the airbag with the arched shape with the upper end 120 pointing towards the occupant 50.

The airbag 112 may include an internal tether system to curve the airbag 112 and provide the airbag 112 with the arched shape. For example, and as illustrated in FIG. 2, within the air chamber 134 the airbag 112 includes a support spine 160 extending at least partially along a length of the airbag 112. Extending from the support spine 160 are a plurality of tethers 162, which are secured to the inner side surface 132 at anchors 164. The tethers 162 are sized, positioned, and otherwise configured to draw the upper end 120 and the lower end 122 towards each other to provide the inner side surface 132 with a concave shape and arch the inner side surface 132 over the seat that the airbag 112 is mounted to (such as the front driver's seat 20, for example).

The airbag 112 further includes an opening to the air chamber 134. The opening may be in the form of an inlet port 170 (see FIG. 3, for example). The inlet port 170 is in fluid communication with an inflator 210. The inflator 210 is any suitable device configured to inflate the airbag 112 (and particularly the air chamber 134) with any suitable gas in the event of an impact (such as a side impact). Also included with the airbag assembly 110 is a diffuser 220. The diffuser 220 is configured manage the flow of high-pressure gas from the inflator 210 before it enters the airbag 112.

Figure 4:
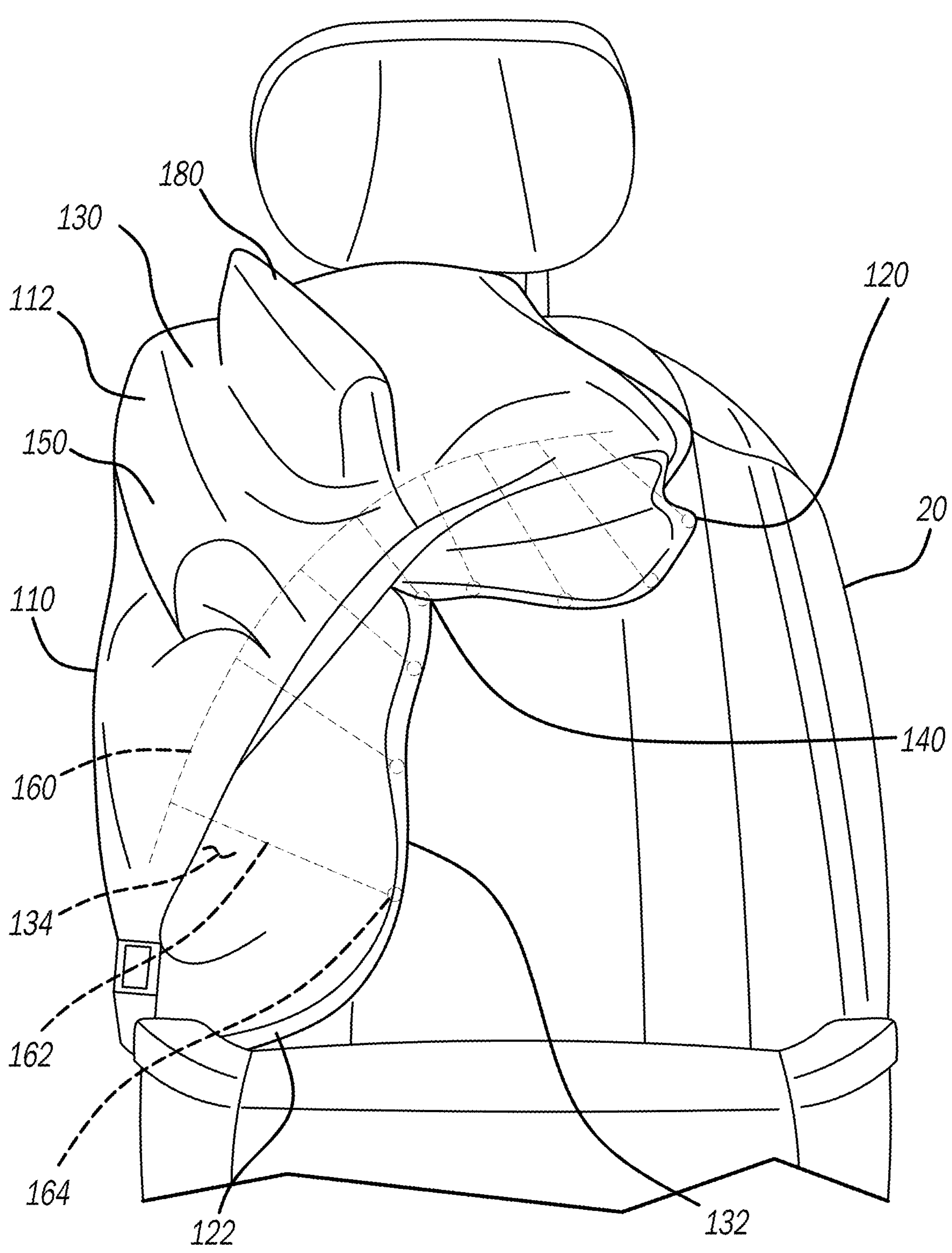
FIG. 4 illustrates a driver's seat of the vehicle including another airbag in accordance with the present disclosure.
Figure 5:
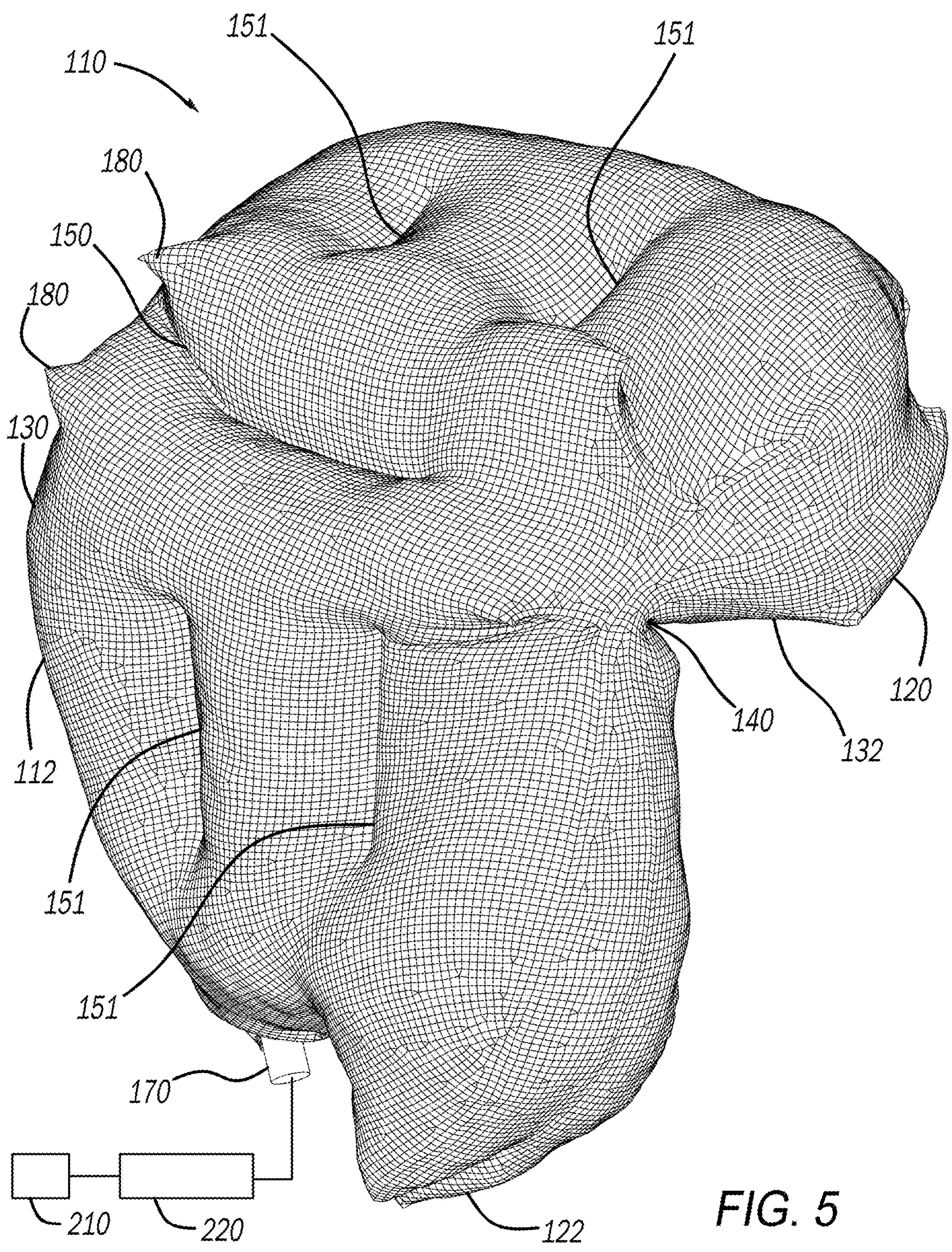
FIG. 5 is a perspective view of the airbag of FIG. 4.

With reference to FIGS. 4 and 5, the airbag 112 may be configured to include any suitable number of elbow chambers 180. The elbow chambers 180 are defined by the outer side surface 130 of the airbag 112. The elbow chambers 180 include outer protrusions at the outer side surface 130 of the airbag 112. Any suitable number of the tethers 162 may be included, such as one or more of the tethers 162 between the elbow chambers 180. The tethers 162 between the elbow chambers 180 extend along a width of the airbag 112. Additional internal tethers 151 may be included, in any direction and positions, to manage volume of the airbag 112 when inflated. The elbow chambers 180 (alone or in combination with the tethers 162) are configured to shape the airbag 112 to curve the outer side surface 130 and the inner side surface 132 and give the airbag 112 the overall curved shape.

The present disclosure thus provides for an airbag assembly 110 including an airbag 112 defining the air chamber 134, which is the only air chamber defined by the airbag 112. The arched shape of the airbag 112 enhances the effectiveness of the airbag 112 to cushion side impact events. The arched shape is provided by the outer side surface 130 and the inner side surface 132, both of which are curved. The curvature of the outer side surface 130 and the inner side surface 132 is provided by the elbow chamber 180 and the tethers 162. The single chamber (the air chamber 134) reduces manufacturing complexity of the airbag 112 and also reduces the final brick size of the airbag 112 when deflated and stored.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An airbag assembly comprising:
an inflator;
a diffuser; and
an airbag defining an air chamber, the airbag including:
an opening to the air chamber in communication with the inflator;
an upper end;
a lower end;
an outer side surface extending from the upper end to the lower end;
an inner side surface extending from the upper end to the lower end opposite to the outer side surface, the inner side surface is concave and configured to face an occupant of a seat when the airbag is deployed; and
an internal tether system including a support spine extending at least partially along a length of the airbag, anchors at the inner side surface, and tethers connecting the support spine to the anchors,
wherein:
the airbag is a single chamber airbag; and
the outer side surface and the inner side surface are curved to provide the airbag with an arched shape; and
the tethers are configured to draw the upper end and the lower end towards each other to provide the inner side surface with a concave shape.

2. The airbag assembly of claim 1, wherein the outer side surface is convex.

3. The airbag assembly of claim 1, wherein the air chamber extends completely from the upper end to the lower end of the airbag.

4. The airbag assembly of claim 1, wherein the inner side surface is shorter than the outer side surface.

5. The airbag assembly of claim 1, wherein the inner side surface includes an inner tapered portion configured to arch the inner side surface.

6. The airbag assembly of claim 1, wherein the airbag is configured to be deployed from a side of the seat.

7. The airbag assembly of claim 6, wherein the airbag is configured as a side impact airbag.

8. The airbag assembly of claim 1, wherein the airbag includes a tapered portion between the upper end and the lower end, at the tapered portion the outer side surface and the inner side surface are closer together than at both an upper midpoint between the tapered portion and the upper end and a lower midpoint between the tapered portion and the lower end.

9. An airbag assembly comprising:
an inflator;
a diffuser; and
an airbag configured as a side impact airbag to be deployed from a side of a seat, the airbag including:

an opening to an interior of the airbag that is in communication with the inflator;

an upper end;

a lower end;

a convex outer side surface extending from the upper end to the lower end;

a concave inner side surface extending from the upper end to the lower end opposite to the convex outer side surface, the concave inner side surface is configured to face an occupant of the seat when the airbag is deployed;

an internal tether system including a support spine extending at least partially along a length of the airbag, anchors at the concave inner side surface, and tethers connecting the support spine to the anchors, the tethers configured to draw the upper end and the lower end towards each other to provide the concave inner side surface with a concave shape;

a tapered portion between the upper end and the lower end, at the tapered portion the convex outer side surface and the concave inner side surface are closer together than at both an upper midpoint between the tapered portion and the upper end and a lower midpoint between the tapered portion and the lower end; and a single air chamber defined by the upper end, the lower end, the convex outer side surface, and the concave inner side surface, the single air chamber extending completely from the upper end to the lower end of the airbag.

10. The airbag assembly of claim 9, wherein the convex outer side surface and the concave inner side surface are curved to provide the airbag with an arched shape.

11. The airbag assembly of claim 9, wherein the concave inner side surface is shorter than the convex outer side surface.

12. The airbag assembly of claim 9, wherein the concave inner side surface includes an inner tapered portion configured to arch the concave inner side surface.

13. A vehicle comprising:

a seat; and an airbag mounted adjacent to the seat and configured as a side impact airbag to be deployed from a side of the seat, the airbag including:

an opening to an interior of the airbag that is in communication with an inflator;

an upper end;

a lower end;

a convex outer side surface extending from the upper end to the lower end;

a concave inner side surface extending from the upper end to the lower end opposite to the convex outer side surface, the concave inner side surface is configured to face an occupant of the seat when the airbag is deployed;

an internal tether system including a support spine extending at least partially along a length of the airbag, anchors at the concave inner side surface, and tethers connecting the support spine to the anchors, the tethers configured to draw the upper end and the lower end towards each other to provide the concave inner side surface with a concave shape;

a tapered portion between the upper end and the lower end, at the tapered portion the convex outer side surface and the concave inner side surface are closer together than at both an upper midpoint between the tapered portion and the upper end and a lower midpoint between the tapered portion and the lower end; and a single air chamber defined by the upper end, the lower end, the convex outer side surface, and the concave inner side surface, the single air chamber extending completely from the upper end to the lower end of the airbag.

14. The vehicle of claim 13, wherein the convex outer side surface and the concave inner side surface are curved to provide the airbag with an arched shape.

15. The vehicle of claim 13, wherein the concave inner side surface is shorter than the convex outer side surface.

16. The vehicle of claim 13, wherein the concave inner side surface includes an inner tapered portion configured to arch the concave inner side surface.

17. The vehicle of claim 13, wherein the airbag is mounted on an inner side surface of the seat.

* * * * *